United States Patent [19]
Chipchase

[11] 3,970,072
[45] July 20, 1976

[54] HEATING MEANS FOR COMESTIBLE KETTLE
[75] Inventor: Frank D. Chipchase, West Milford, N.J.
[73] Assignee: International Multifoods Corporation, Minneapolis, Minn.
[22] Filed: Oct. 2, 1974
[21] Appl. No.: 511,226

[52] U.S. Cl.................................. 126/391; 99/403
[51] Int. Cl.² ........................................ A47J 27/026
[58] Field of Search .............. 126/391, 347; 99/408, 99/403, 407, 405

[56] References Cited
UNITED STATES PATENTS

| | | | |
|---|---|---|---|
| 2,712,308 | 7/1955 | Keating | 126/391 |
| 3,313,288 | 4/1967 | Aho | 126/391 |

Primary Examiner—Edward G. Favors
Attorney, Agent, or Firm—Merchant, Gould, Smith, Edell, Welter & Schmidt

[57] ABSTRACT

An improvement in comestible cooking equipment comprising means for preventing convection currents in the cooking fluid, color variation in the comestibles when cooked, and rapid breakdown of the cooking fluid, by improving the uniformity of heat transfer to the fluid from heaters submerged in the fluid, each heater comprising a tube connected to a flue at one end and having a flame directed by a burner into the other end. The improvement reduces the proportion of heat transmitted to the fluid at the burner end of the heaters, and increases the portion at the flue end. The heater tube contains a shroud tube of perforated metal, at the burner end, and an axial, conical baffle tube at the other end. The former converts a portion of the direct heat to radiant heat, and the latter displaces hot gases outwardly toward the inner surface of the heater and increases their velocity.

9 Claims, 3 Drawing Figures

U.S. Patent  July 20, 1976  3,970,072
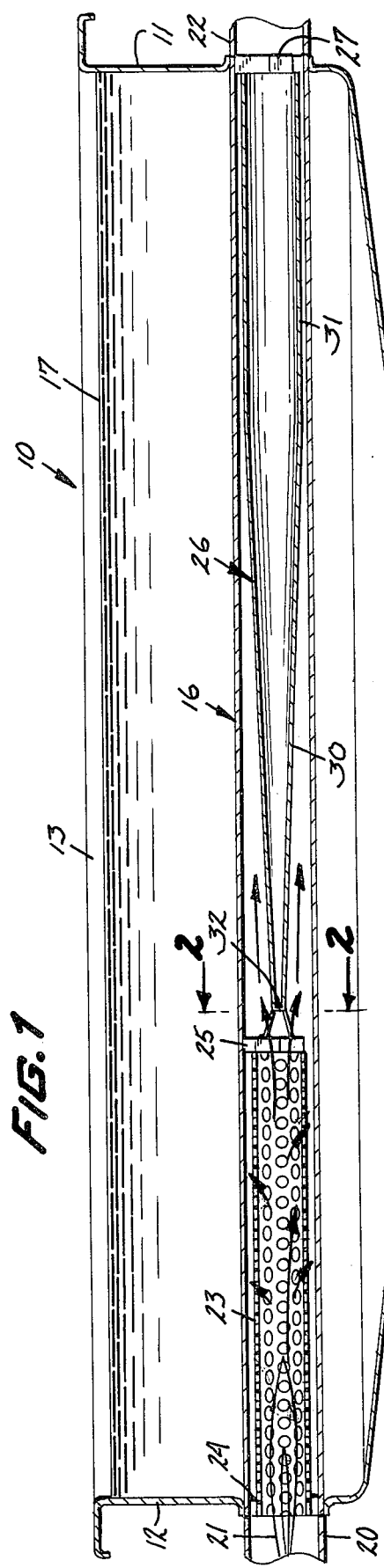
FIG. 1
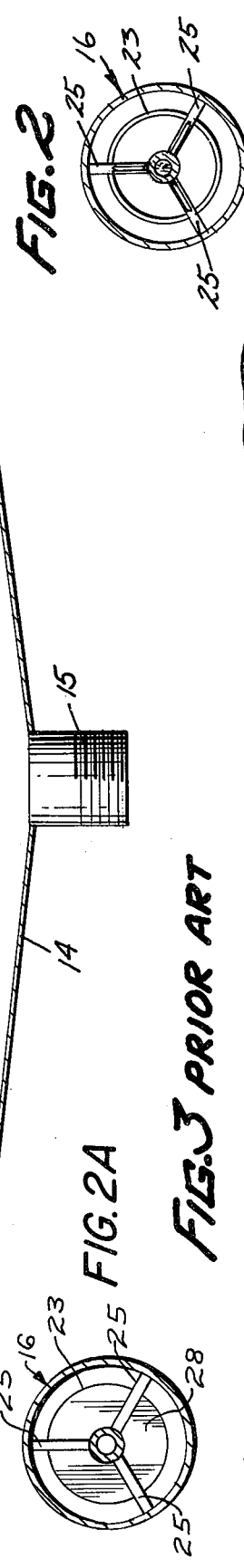
FIG. 2
FIG. 2A
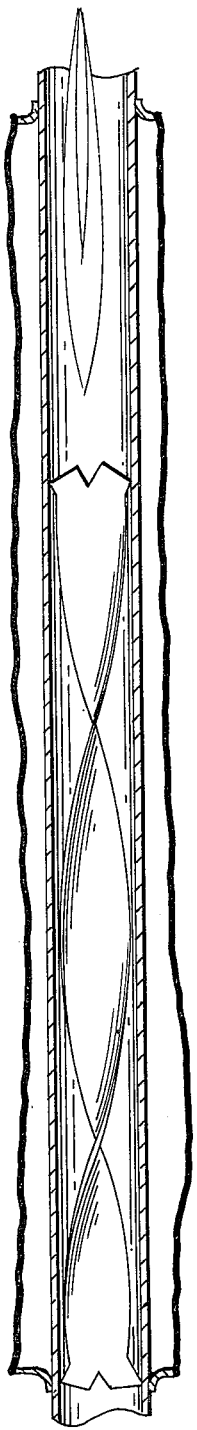
FIG. 3 PRIOR ART

HEATING MEANS FOR COMESTIBLE KETTLE

BACKGROUND OF THE INVENTION

This invention relates to the field of commercial cookery, and more particularly to comestible kettles wherein comestibles are cooked by floating in a heated fluid such as shortening. Typically a kettle of this sort is a shallow container of considerable size, containing the cooking fluid, and crossed at intervals by heaters in the form of tubes which remain below the surface of the fluid. Each heater has a flame directed into one of its ends by a suitable burner which supplies both the fuel and the air necessary for combustion, the other end of the heater being connected to an exhaust header or flue. Comestibles are placed in the fluid at one end of the kettle and are removed at the other end after cooking.

When it is attempted to increase the production of comestibles by a kettle such as this, the only variable available to the designer is the area of the fluid on which the comestibles float while frying. An attempt to increase this area by lengthening the kettle quickly reached a limitation in that the interval of contact with the hot fluid cannot be extended without injury to the quality of the product so that the comestibles had therefore to move through the longer kettle more rapidly; a condition was reached in which it became physically impossible to perform rapidly enough the necessary process of turning the comestibles over to cook the second side.

Difficulty has also been experienced in attempting to increase the cooking area by widening the kettle. Experience has shown that a considerable thermal gradient exists across such a heater, the end nearer the burner being considerably hotter than the flue end. This results in product color variation, the comestibles moving along the side of the kettle where the burners are located being darker than those on the other side of the kettle. It also results in convection currents in the fluid which cause the products to crowd together toward the colder side of the kettle. Finally it results in rapid breakdown of the cooking fluid by reason of contact with high temperature heater tube ends.

An attempt to overcome these effects by including a spiral metal baffle within the heater tube for a considerable portion of its length extending from the flue end, as suggested in FIG. 3, has not met with success.

SUMMARY OF THE INVENTION

I have discovered that it is possible to reduce the proportion of heat transmitted to the fluid at the burner end of the heater tube, and simultaneously increase the proportion at the flue end of the tube. This decreases the thermal gradient along the heater tube to a point where the effects itemized above are reduced to tolerable levels. I accomplish it by inserting a shroud tube into the heater tube at the burner end, and an axial baffle tube into the heater tube at the flue end. The shroud tube is perforated and when the flame is directed into it at least part of the flame heat is converted to radiant heat which is more uniform and less intense. The baffle tube is conical for at least a portion of its length, its smallest diameter being furthest from the flue end and being closed. Hot gases from the flame are thus displaced ever closer to the inner surface of the heater tube, and move with ever greater velocity. Both of these effects lead to greater heat transfer toward the flue end of the heater tube.

A principle object of the invention is accordingly to provide an improved comestible kettle including an improved heater therefor. Another object of the invention is to provide a comestible kettle heater along which the thermal gradient is small. Another object is to provide such a heater with means at its burner end for decreasing the proportion of the heat transmitted to the fluid. Another object is to provide such a heater with means at the flue end thereof for increasing the proportion of heat transmitted to the fluid. Another object of the invention is to provide a method for increasing the uniformity of heat transfer to a fluid along the length of a heater tube. A more specific object of the invention is to provide a heater with an internal shroud tube at its burner end and an internal tapering baffle tube at its flue end, which function to reduce the thermal gradient along the tube.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing FIG. 1 is a sectional view of a comestible kettle including an improved heater according to my invention;

FIG. 2 is a fragmentary sectional view along the line 2—2 of FIG. 1; FIG. 2A is a view similar to FIG. 2 showing a modification; and FIG. 3 shows a prior art structure.

DESCRIPTION OF THE PREFERRED EMBODIMENT

In the drawing reference numeral 10 identifies a comestible kettle having side walls 11 and 12, and end wall 13, and a bottom 14 with a drain 15. Walls 11 and 12 are pierced at corresponding points along their length to receive heaters, one of which is shown at 16. The heaters are tubes welded or otherwise sealed in leak proof fashion to the walls, and are located near the bottom of the kettle, which is filled with a cooking fluid such as shortening to a level 17 so that the heater tubes are always submerged in liquid. The kettle is supported in any suitable fashion not shown.

At the left of FIG. 1 the heater is shown to be connected to a burner 20 of conventional nature, which supplies a flame 21 including a fuel such as oil or gas and a supply of air or oxygen to support the combustion of the fuel. At the right of FIG. 1 the heater is shown to be connected to a flue or header 22 through which the combustion products are exhausted.

The elements so far described coact to form an entirely operative comestible kettle, but one which has so high a thermal gradient along its heaters that product color variation, strong convection currents in the fluid and rapid fluid breakdown occur. These defects are overcome by structure about to be described.

At the burner end of heater 16 is located means for reducing the proportion of heat transmitted to the fluid. This means comprises a shroud tube 23 of perforated metal into which the flame from burner 20 is directed. Tube 23 is of considerably smaller diameter than heater 16, and is supported in the heater by means such as spiders 24 and 25. The burner flame 21 is directed into shroud tube 23 and at least a portion of the flame passes outwardly through the perforations, to impinge on heater 16. Another portion of the flame remains within shroud tube 23 and acts to heat the latter until it becomes itself a source of radiant energy for heater 16. Radiant energy is however more uniform and less intense than direct flame heat, and accordingly the proportion of the flame heat supplied to the burner end of the heater is considerably reduced.

In one embodiment of the invention the perforated metal making up shroud tube 23 was about 1/3 open, and the shroud tube was essentially open at spider 25, but it will be appreciated that other degrees of perforation may be desirable in other applications and that tube 23 may be closed at spider 25, as shown at 28 in FIG. 2A.

At the flue end of heater 16 is located means for increasing the proportion of heat transmitted to the fluid. This comprises a baffle tube 26 coaxial with heater 16, and supported therein by spiders 25 and 27. Baffle tube 26 comprises a conical portion 30 next to spider 25 and a cylindrical portion 31 next to spider 27. Portions 30 and 31 are unitary. The small end of baffle tube 26 is closed at 32, and the diameter of the tube increases toward its flue end to a maximum which is significantly less than the inside diameter of the heater.

Baffle tube 26 has two functions. In the first place it spatially occupies what would be the cold cone of the flame, thus displacing the hot gas outward toward the inner wall of the heater for better thermal interrelation. In the second place, the baffle tube acts to reduce the cross sectional area available for flow of hot gas, so that the velocity of the gas increases to also increase the heat transfer.

In one successful embodiment of the invention, in which the kettle was 57 inches wide, the length of tube 23 was about ⅓ the width of the kettle, and the conical and cylindrical portions of tube 26 were of substantially equal length. Other ratios between the lengths of tube 23 and tube 26 may be optimum for kettles of other widths.

It will be evident that I have devised a new method for heating a cooking fluid more uniformly, and a new apparatus for practicing the method. In the embodiment of the invention referred to above the thermal gradient was 66° over a length of about 57 inches, compared to a gradient of 103° over a length of 33 inches in a prior art structure.

Numerous objects and advantages of my invention have been set forth in the foregoing description, together wth details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim as my invention:

1. In a fire-tube type of heater, for a comestible kettle, comprising an outer tube in heat exchange relation with cooking fluid to be heated, a flue connection to said outward tube thereof, and burner means directing a flame into said outer tube at the other end thereof, the improvement which comprises:

an inner shroud tube of perforated metal mounted within and spaced from said outer tube at the burner end thereof so that said flame is directed into said shroud tube, whereby some flame passes outward through the perforations to heat said outer tube directly, and some flame remains within said shroud tube to heat said shroud tube until it acts as a radiant heat source within said outer tube;

and an inner baffle tube mounted coaxially at the flue end of said outer tube to displace hot gases from said shroud tube toward the inner surface of said outer tube.

2. Apparatus according to claim 1 in which the length of said shroud tube is about ⅓ the length of said outer tube.

3. Apparatus according to claim 1 in which said shroud tube is closed at its end remote from the burner means to prevent hot gases from emerging axially therefrom.

4. Apparatus according to claim 1 in which said shroud tube has about ⅓ open area.

5. Apparatus according to claim 1 in which said baffle tube includes a first portion of constant diameter located at the flue end of said outer tube and a second conical portion, unitary with said first portion, of diameter decreasing toward a minimum nearest the burner end of said outer tube.

6. Apparatus according to claim 1 in which said baffle tube includes a conical portion having its least diameter nearest said shroud tube and increasing in diameter toward the flue end.

7. Apparatus according to claim 1 in which the length of said baffle tube is about ⅔ the length of said outer tube.

8. Apparatus according to claim 1 in which said baffle tube is closed at its end remote from the flue to prevent hot gases from entering the baffle tube.

9. In a comestible cooking kettle comprising a shallow container of cooking fluid in which the comestibles float, a plurality of heaters extending transversely of said container below the surface of said fluid, burner means directing flames into first ends of said heaters, and flue means withdrawing combustion products from second ends of said heaters, the improvement, for reducing convection currents in the fluid and color variations in the cooked comestibles, which comprises means modifying the flame paths through the heaters to decrease the proportion of heat available to the fluid at the burner ends and increase that available at the flue ends, the modifying means including an inner shroud tube of perforated metal mounted within and spaced from said heater at the burner end thereof so that said flame is directed into said shroud tube, whereby some flame passes outward through the perforations to heat the heater directly, and some flame remains within said shroud tube to heat said shroud tube until it acts as a radiant heat source within said heater: and an inner baffle tube mounted coaxially at the flue end of said heater to displace hot gases from said shroud tube toward the inner surface of said heater and increase their velocity.

* * * * *